United States Patent
Mita et al.

(10) Patent No.: US 7,700,671 B2
(45) Date of Patent: Apr. 20, 2010

(54) CEMENT COMPOSITION FOR EXTRUSION MOLDING

(75) Inventors: Toshihiko Mita, Saitama (JP); Takeyuki Deyama, Hannou (JP); Ryuichi Kido, Hannou (JP); Masashi Yamauchi, Kanzaki-gun (JP); Takafumi Akahira, Titibu-gun (JP); Tatsuya Matsui, Kawasaki (JP); Akinori Ito, Meguro-ku (JP)

(73) Assignee: NOF Corporation, Tokyo (JP)

( * ) Notice: Subject to any disclaimer, the term of this patent is extended or adjusted under 35 U.S.C. 154(b) by 186 days.

(21) Appl. No.: 11/629,356

(22) PCT Filed: Jun. 15, 2005

(86) PCT No.: PCT/JP2005/011387

§ 371 (c)(1),
(2), (4) Date: Feb. 5, 2007

(87) PCT Pub. No.: WO2005/123625

PCT Pub. Date: Dec. 29, 2005

(65) Prior Publication Data
US 2008/0045633 A1    Feb. 21, 2008

(30) Foreign Application Priority Data
Jun. 15, 2004    (JP) .............................. 2004-176372

(51) Int. Cl.
C04B 24/26    (2006.01)

(52) U.S. Cl. .............................................. 524/2; 524/5
(58) Field of Classification Search ....................... 524/2
See application file for complete search history.

(56) References Cited

U.S. PATENT DOCUMENTS

2003/0071392 A1 *    4/2003    Sasage et al. .......... 264/211.11

FOREIGN PATENT DOCUMENTS

| JP | A 03-153551 | 7/1991 |
| JP | A 06-100347 | 4/1994 |
| JP | A 09-142905 | 6/1997 |
| JP | A 2001-253743 | 9/2001 |
| JP | A 2003-002719 | 1/2003 |

* cited by examiner

Primary Examiner—Ling-Siu Choi
Assistant Examiner—Hui Chin
(74) Attorney, Agent, or Firm—Oliff & Berridge, PLC

(57) ABSTRACT

The cement composition for extrusion molding including 100 weight parts of a blend comprising a hydraulic material, an aggregate and a fiber; 0.1 to 1.5 weight parts of an extrusion aid, 15 to 45 weight parts of water and 0.01 to 2.0 weight parts of a copolymer. The copolymer includes 50 to 99 weight percents of an unit (a) derived from a polyoxyalkylene derivative represented by the formula (1), 1 to 50 weight percents of an unit (b) derived from maleic anhydride or a dicarboxylic acid represented by the following formula (2) and 0 to 30 weight percents of an unit (c) derived from an additional and copolymerizable monomer.

5 Claims, No Drawings

CEMENT COMPOSITION FOR EXTRUSION MOLDING

BACKGROUND OF THE INVENTION

Field of the Invention

The present invention relates to a cement composition for extrusion molding containing a copolymer of a specific polyoxyalkylene derivative, and a cement product produced by hardening the extruded body.

It has been produced a cement product by extrusion molding excellent in surface flatness and moldability by using a cement composition for extrusion molding containing asbestos as fiber. The use of asbestos recently becomes difficult due to regulations, because of the pollution caused by asbestos and exhaustion of the resources. Until now, as the alternatives, it has been used various kinds of fibers including inorganic fibers such as glass fiber, carbon fiber or the like and organic fibers such as pulp, waste paper, polyamide fiber, polyester fiber, polypropylene fiber, vinylon fiber or the like. Among these, pulp has been used in many cases. When pulp is used as the fiber, the strength of the cement and the dispersion as the cement composition for extrusion molding are reduced compared with a prior cement composition using asbestos. Problems arises such as an increase of screw torque, and reduction of the surface flatness and moldability of the cement composition for extrusion molding.

For solving the above problems, it has been tried to use a larger amount of a cellulose derivative originally used as an extrusion aid or to use a cellulose derivative, a synthetic polymer and clay at the same time (for example, Japanese Patent publication No. H03-153551A). The screw torque can be increased and the surface roughness and moldability of the cement composition for extrusion molding can be improved, by using a larger amount of the cellulose derivative. However, the strength at a predetermined time period for wet curing is insufficient, and a long time is needed for the wet-curing of the cellulose derivative to obtain uniform mixture with powdery raw materials after the addition of water due to the larger amount of the cellulose derivative, resulting in reduction of productivity. The plasticity of the at is also increased so that the molded body extruded from a dice expands in open air due to the inner pressure, which is called "spring-back" phenomenon and pointed out as problematic. Further, although the surface flatness and moldability of a cement product by extrusion molding can be improved by using a cellulose derivative, a synthetic polymer and clay, the dispersion proved to be still insufficient. Further, the expression of strength of the molded body is considerably retarded and the workability is deteriorated by using the synthetic polymer additive compared with that using only the cellulose derivative, which was pointed out as problematic.

On the other hand, according to Japanese patent Publication No. H09-142905A, a specific copolymer is used as a concrete additive so that it can be produced concrete having excellent fluidity, a small change of slump and retardation of the setting.

DISCLOSURE OF THE INVENTION

An object of the present invention is to provide a cement composition for extrusion molding in which the dispersion of fibers can be improved, the addition amount of an extrusion aid can be reduced to shorten a time period required for mixing materials after the addition of water and to improve the productivity, the spring-back phenomenon can be prevented, the load during the admixing of materials for extrusion molding can be reduced, the grain size of the materials after the admixing of the materials for extrusion molding can be lowered to facilitate the molding and the strength of the molded body after a predetermined time period can be improved.

The present invention provides a cement composition for evasion molding comprising:
 100 weight parts of a blend comprising a hydraulic material, an aggregate and a fiber;
 0.1 to 1.5 weight parts of an extrusion aid;
 15 to 45 weight parts of water; and
 0.01 to 2.0 weight parts of a copolymer,
wherein said copolymer comprises 50 to 99 weight percents of an unit (a) derived from a polyoxyalkylene derivative represented by the following formula (1), 1 to 50 weight percents of an unit (b) derived from maleic anhydride or a dicarboxylic acid represented by the following formula (2) and 0 to 30 weight percents of an unit (c) derived from an additional and copolymerizable monomer.

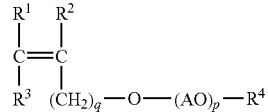

($R^1$, $R^2$ and $R^3$ represents hydrogen atom or methyl group, respectively and independently with each other, "AO" represents one or two or more of an oxyalkylene group(s) having 2 to 4 carbon atoms and may be copolymerized in random or block in the case that two or more kinds of "AO" are included, "R4" represents hydrogen atom or a hydrocarbon group having 1 to 22 carbon atoms, "q" represents an integer of 0 to 2, and "p" represents 100 to 500.)

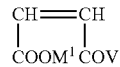

("V" represents —$OM^2$ or —W-$(AO)_r R^5$, "W" represents ether group or imino group, "AO" represents one or two or more oxyalkylene group(s) having 2 to 4 carbon atoms and may be copolymerized in random or block in the case that two or more kinds of "AO" are included, $R^5$ represents hydrogen atom or a hydrocarbon group having 1 to 22 carbon atoms, $M^1$ and $M^2$ represent hydrogen atom, an alkali metal, an alkaline earth metal, ammonium or an organic ammonium group respectively and independently with each other, and "r" represents 1 to 150).

According to a preferred embodiment, in the polyoxyalkylene derivative of the formula (1), $R^1$, $R^2$ and $R^3$ represent hydrogen atom, "AO" represents oxyalkylene groups having 2 to 3 carbon atoms and the ratio of the oxylakylene group having 2 carbons:the polyoxyalkylene group having 3 carbon atoms is 40-90:1-60. "$R^4$" represents hydrogen atom, "q" represents an integer of 1 and "p" represents 120 to 500.

Further, according to a preferred embodiment, water is added in an amount of 15 to 25 weight % with respect to 100 weight % of the blend.

Further, the present invention provides a cement product produced by curing the extrusion molded body of the composition.

According to the cement composition for extrusion molding of the present invention, the dispersion of fibers such as pulp can be improved, the addition amount of an extrusion aid can be reduced to shorten a time period required for the mixing of materials after the addition of water, the spring-back phenomenon can be improved, the load during the admitting of materials for extrusion molding can be reduced, the grain size of material after the admixing of materials for extrusion molding ran be lowered, and the strength of the molded body after a predetermined time period can be improved.

Japanese Patent publication H09-142906A described that a specific copolymer is used as a concrete additive to prevent the change of slump and the retardation of curing of a concrete composition. It is, however, not described a composition for extrusion molding having properties different from those of the concrete. The present invention is based on the discovery that the surface flatness, moldability and the expression of strength of the molded body by extrusion can be considerably influenced by using the above kind of copolymer with an extrusion aid in a cement composition for extrusion molding.

PREFERRED EMBODIMENTS FOR CARRYING OUT THE INVENTION

The cement composition for extrusion molding of the present invention contains, as the essential component, the copolymer comprising 50 to 99 weight percents of an unit (a) derived from a polyoxyalkylene derivative represented by the formula (1), 1 to 50 weight percents of an unit (b) derived from maleic anhydride or an dicarboxylic acid represented by the following formula (2) and 0 to 30 weight percents of an unit (c) derived from an additional and copolymerizable monomer.

According to the formula (1), $R^1$, $R^2$ and $R^3$ represent hydrogen atom or methyl group. According to the formula (1), "AO" represents one or two or more oxyalkylene group(s) having 2 to 4 carbon atoms such as oxyethylene group, oxypropylene group, oxybutylene group or the like. In the case where two or more oxyalkylene groups are used, the groups may be copolymerized in block or random. Oxyethylene and oxypropylene groups are preferred, and more preferably, the ratio of oxyethylene group:oxypropylene group is 40 to 99:1 to 60. Most preferably, the ratio of oxyethylene group:oxypropylene group is 90 to 99:1 to 10.

According to the formula (1), opt is an addition molar number of the oxyalkylene group having 2 to 4 carbon atoms and 100 to 500. "p" may preferably be 120 to 500 and more preferably be 130 to 400. When "p" exceeds 500, the resultant compound would have a high viscosity and the production becomes thus difficult and not preferable.

"q" represents the repetition number of methylene group and an integer of 0 to 2 and preferably 1.

The hydrocarbon group having 1 to 22 carbon atoms represented by $R^4$ of the formula (1) includes aliphatic saturated hydrocarbon groups such as methyl group, ethyl group, propyl group, isopropyl group, butyl group, isobutyl group, secondary butyl group, tertially butyl group, pentyl group, isopentyl group, neopentyl group, hexyl group, heptyl group, octyl group, nonyl group, deryl group, undecyl group, dodecyl group, isotridecyl group, tetradecyl group, hexadecyl group, isocetyl group, octadecyl group, stearyl group, isostearyl group or the like; aliphatic unsaturated hydrocarbon groups such as allyl group, methallyl group, oleyl group or the like; alicyclic saturated hydrocarbon groups such as cyclohexyl group, methyl cyclohexyl group or the like; alicyclic unsaturated hydrocarbon groups such as cyclopentenyl group, cyclohexenyl group or the like; aromatic hydrocarbon groups or substituted aromatic hydrocarbon groups such as phenyl group, benzyl group, crezyl group, butylphenyl group, dibutyl phenyl group, octyl phenyl group, nonyl phenyl group, dodecyl phenyl group, dioctyl phenyl group, dinonyl phenyl group, α-methyl benzyl phenyl group or the like. Single kind of the group may be used or two or more kinds of the groups may be mixed and used. Hydrogen atom and a hydrocarbon group having 1 to 8 carbon atoms are preferred and hydrogen atom is most preferred. When the number of carbon atoms forming the hydrocarbon group represented by $R^4$ exceeds 22, the hydrophilic property becomes insufficient and not preferred.

According to the formula (2), $M^1$ and $M^2$ represent hydrogen atom, an alkali metal, alkaline earth metal ammonium or an organic ammonium group. The alkali metal includes lithium, sodium, gallium, rubidium or the like.

The alkaline earth metal includes magnesium, calcium or the like.

The organic onium means an ammonium compound derived from an organic amine. The organic amine includes alkanol mes such as monoethanol amine, diethanol amine, triethanol amine; and alkyl amines such as methyl amine, dimethyl amine, trimethyl amine, ethyl amine, diethyl amine, triethyl amine or the like. Monoethanol amine, diethanol amine, methyl amine, diethyl amine are preferred.

"V" of the formula (2) represents —$OM^2$ or —$W$-$(AO)_rR^5$, "W" represents ether group or imino group. Ether group represents —O— and imino group represents —NH—. "r" is the addition molar number of the polyoxyalkylene group having 2 to 4 carbon atoms and 1 to 150, and may preferably be 10 to 100 and more preferably 20 to 70. When "r" exceeds 150, the thus obtained compound would have a high viscosity and the production becomes difficult, which is not preferred.

The unit derived from the additional and copolymerizable monomer forms the copolymer having the polyoxyalkylene derivative used in the cement composition for extrusion molding according to the present invention. The monomer may be added in a range that the effects of the present invention are not deteriorated. The monomer includes vinyl acetate, sodium ally sulfonate, sodium methallyl sulfonate, methacrylic acid, acrylic acid or the like.

The copolymer comprising polyoxyalkylene derivative is used in the cement composition for extrusion molding of the present invention, and comprises 50 to 99 weight percents of an unit (0 derived from a polyoxyalkylene derivative represented by the formula (1), 1 to 60 weight percents of an unit (b) derived from maleic acid or a dicarboxylic acid represented by the formula (2) and 0 to 30 weight percents of an unit (c) derived from an additional and copolymerizable monomer. Preferably, the copolymer comprises 80 to 99 weight percent of (a), 1 to 20 weight percent of (b) and 0 to 20 weight percent of (c).

The copolymer having the polyoxyalkylene derivative and for use in the cement composition for extrusion molding of the invention has a weight average molecular weight of 500 to 100000 and preferably 5000 to 30000. If the compound has a weight average molecular weight exceeding 100000, the dispersion in the cement composition for extrusion molding is deteriorated and the viscosity is high so that the production becomes difficult, and thus not preferable.

Further, the copolymer having the polyoxyalkylene copolymer for the cement composition for extrusion molding of the invention can be obtained by polymerization using a polymerization initiator according to a known method. The polymerization may be bulk polymerization or solution polymerization. In the case of solution polymerization using water as a solvent, it may be used a persulfate including sodium persulfate, potassium persulfate, ammonium persulfate or the like, hydrogen peroxide or a water soluble azo initiator. In this case, it may be used an accelerator such as sodium hydrogen sulfite, hydroxylamine hydrochloride, thiourea, sodium hypophosphite or the like. Further, in the case of solution polymerization using an organic solvent such as a lower alcohol including methanol, ethanol, isopropanol or the like; an aliphatic hydrocarbon including n-hexane, 2-ethyl hexane, cyclohexane or the like; an aromatic hydrocarbon including toluene and xylene; and acetone, methyl ethyl ketone, ethyl acetate or the like, or in the case of bulk polymerization, it may be used an organic peroxide such as benzoyl peroxide, di-t-butyl peroxide, t-butyl peroxy isobutyrate or the like or an azo compound such as azobisisobutyronitrile. Further, in these cases, a chain transfer agent such as thioglycol acid, mercapto ethanol or the like can be used. According to a preferred polymerization process, water is used as a solvent in solution polymerization, and polyoxyalkylene derivative is produced and left in a reaction container, into which all of a maleic acid series compound, an initiator and water are charged to carry out the polymerization at a temperature of 45 to 65° C.

The composition of the invention comprises a hydraulic material as the essential component. The hydraulic material includes portland cements such as plain, early-strength, moderate-heat and belite cements; blended cements containing the portland cement blended with mineral powder including blast-furnace slag, fry ash, silica fume, limestone or the like; alumina cement, gypsum or the like, and single specie may be used or two or more of species may be used at the same time. Although the amount of the hydraulic material is not limited, for example, the hydraulic material may preferably occupy 25 to 76 weight parts of 100 weight parts of the blend.

The inventive composition contains an aggregate as the essential component. The aggregate includes river sand, silica sand, silica rock powder, light-weight aggregate, wollastonite, mica, fly ash, blast-furnace slag, silica fume, lime stone, volcanic ash, pozzolan or the like, and single specie may be used or two or more of species may be used at the same time. Although the amount of the aggregate is not limited, for example, the aggregate may preferably occupy 20 to 70 weight parts of 100 weight parts of the blend. It is preferred to use one or two or more of river sand, silica sand, silica rock powder, light-weight aggregate and fly ash, as the aggregate.

The inventive composition contains a fiber as the essential component. The fiber includes an inorganic fiber such as glass fiber, carbon fiber or the like and an organic fiber such as pulp, waste paper, polyamide fiber, polyester fiber, polypropylene fiber, vinylon fiber or the like, and single specie may be used or two or more of species may be used at the same time. Although the amount of the fiber is not limited, for example, the fiber may preferably occupy 1 to 10 weight parts of 100 weight parts of the blend.

The inventive cement composition for extrusion molding contains an extrusion aid as the essential component. The extrusion aid includes a cellulose derivative such as methyl cellulose, ethyl cellulose, hydroxylpropyl cellulose, hydroxylethyl cellulose, hydroxylmethyl ethyl cellulose, hydroxyl propyl methyl cellulose or the like; or a water soluble polymer compound such as polyether urethane resin, polyvinyl alcohol, polyethylene oxide, polyacrylamide or the like. The cellulose derivative and polyether urethane resin are preferred among them, and methyl cellulose, hydroxylpropyl cellulose, hydroxy ethyl methyl cellulose and hydroxylpropyl methyl cellulose are most preferred.

The extrusion aid may preferably be added in an amount of 0.1 to 1.5 weight parts, and more preferably 0.2 to 1.0 weight parts, with respect to 100 weight parts of the blend consisting of the hydraulic material, the aggregate and the fiber. Although the amount of the extrusion aid may shift depending on the blending conditions of the blend consisting of the hydraulic material, the aggregate and the fiber, when the amount of the extrusion aid is lower than the above range, the performance of the extrusion aid would not be obtained so that Dog's tooth tends to be generated in a product obtained by extrusion molding, which is not preferable. When the amount exceeds the above range, expansion would be generated in the product obtained by extrusion molding due to spring-back phenomenon, which is not preferable.

The amount of the copolymer having the polyoxyalkylene derivative is 0.01 to 2.0 weight parts, more preferably 0.03 to 1.0 weight parts and most preferably 0.05 to 0.5 weight parts, with respect to 100 weight parts of the blend. When the amount of the copolymer having the polyoxyalkylene derivative is lower than the above range, the effects of the invention cannot be obtained. When the amount exceeds the above range, the viscosity of the extrusion aid such as methyl cellulose would be lost so that Dog's tooth tends to be generated in a product obtained by extrusion molding, which is not preferable.

The amount of water is 15 to 46 weight parts with respect to 100 weight parts of the blend (In this case, the total amount of the blend and water is 115 to 145 weight parts). The amount of water may preferably be 30 weight parts or lower and more preferably be 25 weight parts or lower. When the amount of water is lower than 15 weight parts, the load required for admixing of the composition for extrusion molding becomes large, which is not preferred.

When a body is produced by extrusion molding according to the present invention, the above components and an optional component are added and mixed to produce the composition for extrusion molding, which is then charged into an extruder having a predetermined due. The inner space of the extruder is evacuated to subject the composition to exon molding. After the extrusion molding is completed, the obtained molded body is pre-set for 2 to 3 hours at room temperature and then subjected to wet curing (primary curing). Then wet curing is carried out by holding the molded body at 60° C. for 6 to 10 hours, and the wet cured body is then subjected to autoclave curing at 0.1 to 2 MPa for 4 to 8 hours. The cured body is then naturally cooled to obtain a molded body.

EXAMPLES

The present invention will be dewed below referring to examples. Table 1 shows the structural formulas of the compounds shown in tables (1) and (2), the compositions of copolymerization and weight average molecular weights.

TABLE 1

| Production Example | Compound represented by formula (1) (weight %) | Compound represented by formula (2) (weight %) | Weight average molecular weight (by G P C) |
|---|---|---|---|
| 1 | $H_2C=CHCH_2O[(C_3H_6O)_{11}/(C_2H_4O)_{210}]H$ 90.3 | Disodium maleate 9.7 | 20,200 |
| 2 | $H_2C=CHCH_2O[(C_3H_6O)_6/(C_2H_4O)_{130}]H$ 89.6 | Disodium maleate 10.4 | 15,600 |
| 3 | $H_2C=CHCH_2O(C_2H_4O)_{330}H$ 90.1 | Dipotassium maleate 9.9 | 23,400 |

TABLE 1-continued

| Production Example | Compound represented by formula (1) (weight %) | Compound represented by formula (2) (weight %) | Weight average molecular weight (by G P C) |
|---|---|---|---|
| 4 | $H_2C=CHCH_2O[(C_3H_6O)_{100}/(C_2H_4O)_{100}]H$ 89.2 | Monosodium Maleate 10.8 | 27,000 |
| 5 | $H_2C=CHCH_2O(C_3H_6O)_{11}(C_2H_4O)_{210}H$ 96.5 | Disodium maleate 3.5 | 20,200 |

Production Example 1

994 grams (0.1 mole) of polyoxyethylene (the average addition molar number of 210 of ethylene oxide) oxypropylene (the average addition molar number of 11 of propylene oxide) monoallyl ether, 707 grams of water and 58.8 grams (0.6 mole) of maleic anhydride were charged into a 3-liter flask equipped with a mixer, a thermometer, an introduction tube for nitrogen gas and a condenser and cooler. 24.2 grams (0.1 mole) of sodium persulfate was added at 35° C. as a polymerizing initiator. After air in the system was replaced with nitrogen gas, the reaction was performed at 60±2° C. for 10 hours. After the termination of the polymerization reaction, 100 grams of 48% sodium hydroxide aqueous solution (1.2 mole of sodium hydroxide) was added to the mixture for the neutralization and 929 grams of water was further added to obtain 40% aqueous solution of the copolymer.

Production Example 2

29 grams (0.5 mole) of allyl alcohol and 1.0 grams of sodium methylate as a catalyst were charged in 5 liter pressurized reactor and air in the reactor was replaced with nitrogen gas. Then, into the reactor, it is gradually supplied solution of 2860 grams (65.0 mole) of ethylene oxide and 174 grams (3.0 mole) of propylene oxide mixed in advance at 100 to 120° C. at a pressure of about 0.05 to 0.5 MPa gauge pressure), to proceed addition reaction. After the termination of the reaction, the mixture was cooled to 80° C. and 2450 grams of the addict was removed from the reactor. The reactor was then cooled to 60° C., and 443 grams of water and 39.2 grams (0.4 mole) of maleic anhydride were added to the reaction solution. 11.9 grams (0.05 mole) of sodium persulfate was added as a polymerization initiator at a temperature under 35° C. and air in the system was replaced with nitrogen gas. The reaction was then continued for 10 hours at 60±2° C. After the termination of the polymerization reaction, 106.7 grams of 30% sodium hydroxide aqueous solution (0.8 mole of sodium hydroxide) was added to the mixture for the neutralization and 526 grams of water was further added to obtain 40% aqueous solution of the copolymer.

Production Examples 3 to 5

The reaction was carried out according to the same procedure as the Production Example 1, except that the compounds of the formulas (1) and (2) were changed as shown in tale 1, to obtain solution of the copolymer. However, according to the Production Example 3, aqueous solution of potassium hydroxide was used instead of sodium hydroxide aqueous solution.

Production Example 6

The reaction was carried out according to the same procedure as the production Example 1, except that polyoxyethylene monoallyl ether (having an average addition molar number of 34 of ethylene oxide) was used instead of the compound of the formula (1) and disodium maleate was used instead of the compound of the formula (2), to obtain solution of the copolymer.

Production Example 7

The reaction was carried out according to the same procedure as the production Example 1, except that polyoxyethylene monoallyl monomethyl ether (having an average addition molar number of 68 of ethylene oxide) was used instead of the compound of the formula (1) and maleic acid was used instead of the compound of the formula (2), to obtain solution of the copolymer.

Examples 1 to 10, Comparative Examples 1 to 9

Table 2 shows compositions of raw materials used. As to specific names of the raw materials, the blend was composed of normal portland cement (manufactured by Mitsubishi Material Co. Ltd) as the hydraulic material, silica rock powder (Blaine: 3800±400 $cm^2/g$; manufactured by Fuzisako Saiseki Kogyo) as the aggregate, fry ash (product of Hokkaido Electric Power Co. Inc.; Sunagawa Power Plant, II grade) and river sand (coarse grain ratio of 1.2; supplied from Kashima, Ibaraki•prefecture) or light-weight aggregate (parlite: average grain size of lower than 0.6 μm, manufactured by Ube Parlite Co. Ltd.), and ground pulp of newspaper waste (passed through 15 mesh: manufactured by Oji Paper Co. Ltd). To 100 weight parts of the blend, hydroxyethyl methyl cellulose (SNB-60T, manufactured by Shin-Etsu Chemical Co., Ltd) as methyl cellulose, the copolymers shown in the Production Examples 1 to 7, oxycarboxylic acid and water were added to obtain raw materials (however, the copolymer was not added in the comparative examples 1, 2 and 7). The above materials excluding the copolymer and water were mixed homogeneously by Eirich mixer for 2 minutes and the copolymer and water were added thereto. After the value of agitator current of the mixer started to rise due to the load, the materials were mixed for 2 minutes and then extruded by means of an extruder equipped with a dice having a thickness of 60 mm and a width of 600 mm. The molded body was subjected to wet curing under the condition of 60° C. and 8 hours, and then subjected to autoclave curing under the condition of 1 MPa and 6 hours. The resulting body was cut into a length of 3000 mm to obtain a product.

For the respective products, it was measured a load during the mixing, admixing time after the addition of water, grain size of the material after the mixing, the value of expansion after the drawing from the dice during the extrusion molding, surface state of the extrusion molded body, linearity of the product, bending strength and bulk specific gravity. The results were shown in tables 3, 4 and 5.

TABLE 2

| | Blend 1 | Blend 2 | Blend 3 |
|---|---|---|---|
| Cement | 51 parts | 51 parts | 51 parts |
| Silica rock powder | 30 | 30 | — |
| Fry ash | — | — | 30 |
| River sand | 15 | — | 15 |
| Light-weight aggregate (Perite) | — | 15 | — |
| Pulp | 4 | 4 | 4 |

TABLE 3

| | Composition 1 | | | | | | | | | |
|---|---|---|---|---|---|---|---|---|---|---|
| | Examples | | | | | Comparative Examples | | | | |
| | 1 | 2 | 3 | 4 | 5 | 1 | 2 | 3 | 4 | 5 |
| Kind of additive | Production example 1 | Production example 2 | Production Example 3 | Production Example 4 | Production Example 5 | None | None | Production Example 6 | Production example 7 | Oxycarboxylic acid*5 |
| Amount of Additive*1 (weight %) | 0.2 | 0.2 | 0.2 | 0.2 | 0.2 | — | — | 0.2 | 0.2 | 0.2 |
| Amount of extrusion aid*2 (weight %) | 0.5 | 0.5 | 0.5 | 0.5 | 0.5 | 0.7 | 1.0 | 0.5 | 0.5 | 0.5 |
| Water (weight %) | 20 | 20 | 20 | 20 | 20 | 22 | 20 | 20 | 20 | 22 |
| Load during admixing (A)*3 | 150~170 | 150~170 | 150~170 | 150~170 | 150~170 | 170~200 | 170~280 | 150~170 | 150~170 | 170~200 |
| Admixing time after water addition (minutes) | 3.5 | 3.5 | 4.0 | 3.5 | 3.5 | 4 | 5 | 5 | 5 | 4 |
| Reduction of grain size | ◎ | ◎ | ◎ | ◎ | ◎ | Δ | Δ | ◎ | ◎ | Δ |
| Expansion of width (mm) | +1.0 | +1.0 | +1.0 | +1.0 | +1.0 | +3.0 | +6.0 | +1.0 | +1.0 | Extrusion Is impossible |
| Appearance After molding | ◎ | ◎ | ○ | ◎ | ◎ | Δ | ◎ | Δ | Δ | |
| Linearity | ◎ | ◎ | ◎ | ◎ | ◎ | Δ | ○ | ○ | ○ | |
| Bending strength*4 (N/mm²) | 17.9 | 18.2 | 17.0 | 17.1 | 18.6 | 13.8 | 18.7 | 9.5 | 11.1 | |
| Bulk specific gravity | 1.84 | 1.85 | 1.85 | 1.84 | 1.85 | 1.79 | 1.83 | 1.84 | 1.84 | |

TABLE 4

| | Blend 2 | | |
|---|---|---|---|
| | Example | | Comparative Example |
| | 6 | 7 | 6 |
| Kind of additive | Production Example 1 | Production Example 2 | None |
| Amount of additive*1 (weight %) | 0.2 | 0.2 | — |
| Amount of extrusion aid*2 (weight %) | 0.5 | 0.5 | 1.0 |
| Water (weight %) | 37 | 37 | 40 |
| Load during admixing (A)*3 | 170~200 | 170~200 | 190~240 |
| Admixing time after water addition (minutes) | 3 | 3 | 4 |
| Reduction of grain size | ○ | ○ | X |
| Expansion of width (mm) | +3.5 | +3.5 | +8 |
| Appearance after molding | ◎ | ◎ | X |
| Linearity | ○ | ○ | Δ |
| Bending strength*4 (N/mm²) | 11.8 | 12.2 | 6.2 |
| Bulk specific gravity | 1.15 | 1.16 | 1.13 |

TABLE 5

| | Composition 3 | | | | | |
|---|---|---|---|---|---|---|
| | Examples | | | Comparative Examples | | |
| | 8 | 9 | 10 | 7 | 8 | 9 |
| Kind of additive | Production Example 1 | Production Example 1 | Production Example 2 | None | Production Example 6 | Oxycarboxylic Acid *5 |
| Amount of Additive *1 (weight %) | 0.2 | 0.1 | 0.1 | — | 0.2 | 0.2 |
| Amount of extrusion aid *2 (weight %) | 0.5 | 0.5 | 0.5 | 1.0 | 0.5 | 0.5 |
| Water (weight%) | 16 | 18 | 18 | 18 | 16 | 18 |
| Load during admixing (A) | 150~170 | 150~170 | 150~170 | 180~200 | 150~170 | 180~200 |
| Admixing time after water addition (minutes) | 3.5 | 3.5 | 3.5 | 5 | 5 | 4 |
| Reduction of grain size of materials | ◎ | ◎ | ◎ | Δ | ◎ | Δ |
| Expansion of width (mm) | +0.5 | +0.5 | +0.5 | +5.0 | +0.5 | Extrusion is possible |
| Appearance alter molding | ◎ | ◎ | ◎ | ◎ | Δ | |
| Linearity | ◎ | ◎ | ◎ | ○ | ○ | |
| Bending strength *4 (N/mm$^2$) | 18.7 | 18.5 | 18.3 | 18.8 | 8.8 | |
| Bulk specific gravity | 1.87 | 1.85 | 1.85 | 1.83 | 1.85 | |

*1: The amount of addition of the additive of the present invention is shown in terms of the amount of the solid content.
*2: hydroxyethyl cellulose ("SNB-60T" manufactured by Shin-Etsu Chemical Co., Ltd) was used as the extrusion aid.
*3: The load during admixing was a value read as current for the mixer just before the evacuation of materials.
*4: After the wet curing, the molded body was dried at 60 ° C. for 24 hours by a hot wind drier and then subjected to bending test at two lines and quadrisection. Further, the bending strength was calculated according to the following formula.

$$F_b = \frac{PL}{8Z} + \frac{wL}{8Z}$$

$F_b$: Bending strength of a panel (N/mm$^2$)
P : Fracture load of bending (N)
L: Length of supporting span (1200 mm)
Z: Section modulus(307 mm$^3$)
w: Self-weight of test piece (N)
*5 : 50 % aqueous solution of gluconic acid (Manufactured by FUSO CHEMICAL CO.,LTD.) was used as oxycarbonic acid.
(Standard for evaluation of reduction of grain size of materials)
◎ ... lmax<20 mm
○ ... Major portion of the grain sizes of materials is lower than 50 mm, and a part of them is larger than 50 mm.
Δ ... Grain sizes of materials are larger than 50 mm and smaller than about 100 mm.
× ... The maximum grain size 1 max > 100 mm
(Standard for evaluation of "appearance after extrusion molding")
Provided that an error of thickness = Δt,
◎... Δ t < 0.5 mm, ○...0.5mm <Δ t<1 mm,
Δ... 1 mm < Δ < 2 mm, ×... Δ t >2 mm
(Standard for evaluation of "Linearity")
Provided that error of linearity = Δ L.
◎...ΔL<1 mm, ○...1 mm<ΔL<2 mm,
Δ...2 mm<ΔL<3 mm, ×...ΔL>3 mm The examples 1 to 5 and comparative example 1 were compared, based on the above results. In spite of reducing the amount of the cellulose derivative according to the inventive composition, the load during the admiring can be reduced at a smaller amount of water, the grain size of the materials can be lowered, the supply of raw materials into an extruder can be made smooth, the value of expansion during the drawing from the dice and the linearity of the product can be improved, and the bending strength after the wet curing can be increased. Based on the comparison of the examples 1 to 5 and comparative example 2, according to the inventive composition, in spite of the reduction of amount of the cellulose derivative, the load during the admixing can be reduced and the mixing time after the water addition can be shortened without the increase of water content. Further, the reduction of grain size of materials can be reduced and the value of expansion during the drawing from the dice can be improved. Based on the comparison of the examples 1 to 5 and the comparative examples 3 and 4, the repetition number of polyoxyalkylene groups of the polyoxyalkylene derivative is small according to the comparative examples 3 and 4. The repetition number of polyoxyalkylene groups of the polyoxyalkylene derivative of the inventive composition is 100 to 500, so that the appearance after the molding can be made good and the bending strength after the wet curing can be considerably improved. According to the comparative example 5, oxycarboxylic acid was used and the extrusion could not be performed.

Based on the comparison of the examples 6, 7 and comparative example 6, in spite of reducing the amount of the cellulose derivative according to the inventive composition, the load during the admixing can be reduced at a smaller amount of water, the grain size of the materials can be lowered, the supply of raw materials into an extruder can be made smooth, the value of expansion during the drawing from the dice and the linearity of the product can be improved, and the bending strength after the wet curing can be increased.

Based on the comparison of the example 8 and comparative example 7, in spite of reducing the amount of the cellulose derivative according to the inventive composition, the load during the admixing can be reduced at a smaller amount of water, the grain size of the materials can be lowered, the supply of raw materials into an extruder can be made smooth, the value of expansion during the drawing from the dice and the linearity of the product can be improved, and the bending strength alter the wet curing can be increased. Further, based on the comparison of the examples 9, 10 and comparative example 7, in spite of reducing the amount of the cellulose derivative according to the inventive composition, the load during the admixing can be reduced at a smaller amount of water, the grain size of the materials can be lowered, the supply of raw materials into an extruder can be made smooth, the value of expansion during the drawing fin the dice and the linearity of the product can be improved, and the bending strength after the wet curing can be increased. Based on the companion of the examples 8 to 10 and comparative examples 8 and 9, the repetition number of polyoxyalkylene groups of the polyoxyalkylene derivative is small according to the comparative example 8. The repetition number of polyoxyalkylene groups of the polyoxyalkylene derivative of the inventive composition is 100 to 500, so that the appearance after the molding can be made good and the bending strength after the wet curing can be considerably improved. According to the comparative example 9, oxycarboxylic acid was used and the extrusion could not be performed.

As described above, according to the present invention, the dispersion of fibers can be improved, a time period required for the mixing of materials after the addition of water can be shortened to improve the productivity, the load during the adding of materials for extrusion molding can be reduced, the grain size of the materials for extrusion molding after the admixing can be lowered, and the value of expansion during the drawing from the dice and the linearity of the product can be improved. Further, the bending strength of the molded body after a predetermined time can be improved so that the extrusion molded products can be produced at a high efficiency.

The invention claimed is:

1. A cement composition for extrusion molding comprising:
100 weight parts of a blend comprising a hydraulic material, an aggregate and a fiber, wherein the fiber comprises pulp;
0.1 to 1.5 weight parts of an extrusion aid;
15 to 25 weight parts of water; and
0.01 to 2.0 weight parts of a copolymer,
wherein said copolymer comprises 50 to 99 weight percent of a unit (a) derived from a polyoxyalkylene derivative represented by the following formula (1)

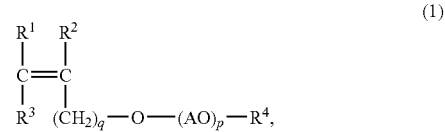

(1)

wherein $R^1$, $R^2$ and $R^3$ are each, independently, a hydrogen atom or methyl group, AO comprises an oxyethylene group and an oxypropylene group, a ratio of the oxyethylene group to the oxypropylene group being 90 to 99:10 to 1, $R^4$ is a hydrogen atom or a hydrocarbon group having 1 to 22 carbon atoms, q is an integer of 0 to 2, and p is 130-400; 1 to 50 weight percent of a unit (b) derived from maleic anhydride or a dicarboxylic acid represented by the following formula (2)

(2)

wherein V is $-OM^2$ or $-W\text{-}(AO)rR^5$, W is an ether group or imino group, AO is at least one oxyalkylene group having 2 to 4 carbon atoms and may be copolymerized in random or block in the case that two or more different AO are included, $R^5$ is a hydrogen atom or a hydrocarbon group having 1 to 22 carbon atoms, $M^1$ and $M^2$ each, independently, a hydrogen atom, an alkali metal, an alkaline earth metal, ammonium or an organic ammonium group, and r is 1 to 150; and 0 to 30 weight percent of a unit (c) derived from an additional copolymerizable monomer.

2. The cement composition for extrusion molding of claim 1, wherein $R^1$, $R^2$ and $R^3$ are each a hydrogen atom, $R^4$ is a hydrogen atom, and q is 1.

3. A cement product produced by curing the cement composition for extrusion molding of claim 1.

4. A cement product produced by curing the cement composition for extrusion molding of claim 2.

5. The cement composition for extrusion molding of claim 1, wherein the unit (b) is derived from maleic anhydride.

* * * * *